US012806691B2

(12) United States Patent
Monteiro et al.

(10) Patent No.: US 12,806,691 B2
(45) Date of Patent: Nov. 24, 2026

(54) STATIONARY CUTTING MACHINE AND METHODS OF CUTTING AND DRAWING THE PIPE PRESERVATION SYSTEM

(71) Applicants: PETRÓLEO BRASILEIRO S.A.—PETROBRAS, Rio de Janiero (BR); INSTITUTO DE PESQUISAS TECNOLÓGICAS DO ESTADO DE SÃO PAULO S.A.—IPT, São Paulo (BR)

(72) Inventors: Murilo Costa Monteiro, Rio de Janeiro (BR); Leandro Aparecido Da Silva Albino, São Paulo (BR); Mario Henrique Fernandes Batalha, São Paulo (BR); Alessandro Guimarães, São Paulo (BR)

(73) Assignees: PETRÓLEO BRASILEIRO S.A.—PETROBRAS, Rio de Janeiro (BR); INSTITUTO DE PESQUISAS TECNOLÓGICAS DO ESTADO DE SÃO PAULO S.A.—IPT, São Paulo (BR)

( * ) Notice: Subject to any disclaimer, the term of this patent is extended or adjusted under 35 U.S.C. 154(b) by 655 days.

(21) Appl. No.: 18/329,995

(22) Filed: Jun. 6, 2023

(65) Prior Publication Data

US 2024/0001451 A1 Jan. 4, 2024

(30) Foreign Application Priority Data

Jun. 7, 2022 (BR) ...................... 10 2022 011135 9

(51) Int. Cl.
*B23B 5/08* (2006.01)
*B23B 1/00* (2006.01)

(52) U.S. Cl.
CPC . *B23B 5/08* (2013.01); *B23B 1/00* (2013.01)

(58) Field of Classification Search
CPC ........... B23B 5/162; B23B 5/161; B23B 5/16; B23B 5/163; B23B 5/168; B23B 2215/72; B26D 3/164; B26D 3/162; B26D 3/282
See application file for complete search history.

(56) References Cited

U.S. PATENT DOCUMENTS 1,811,894 A * 6/1931 Parker ..................... B23B 5/162 82/128
2,092,637 A * 9/1937 Brown .................... B23B 5/162 82/128

(Continued)

FOREIGN PATENT DOCUMENTS

BR 102019015918 2/2021
CN 105499653 4/2016

(Continued)

*Primary Examiner* — Nicole N Ramos
(74) *Attorney, Agent, or Firm* — Knobbe, Martens, Olson & Bear, LLP

(57) ABSTRACT

The present invention refers to a machine for cutting the external coating and methods for removing the Coated Pipe Preservation System for Onshore and Subsea Pipelines, called, for short, PPS System or PPS, represented in FIGS. 1 (1.1), (1.2), (1.3), and (1.4). This Machine, called the PPS Stationary Cutting Machine, represented in FIGS. 7 and 8, in addition to performing the cut at the correct angle (β), represented in FIG. 2 (2.4), makes the FBE Exposure Band (FBE Tail), represented in FIG. 2 (2.3), in order to ensure that the Collar (Cutback), represented in FIG. 2 (2.2), meets the specifications regarding dimensions (C) and (T), represented in FIGS. 2 (2.6) and (2.7), and the finishing at the interface with the Pipe External Coating, being applicable to straight pipes that rotate during the cutting of the external coating. The PPS Automated Drawing Device, represented in FIGS. 9 and 10, used together with the PPS Stationary Cutting Machine, is intended to draw and/or reposition the PPS System in an automated manner through the Cover (1.3, 8.3, and 9.5), increasing productivity and operational safety.

(Continued)

Together with the PPS Automated Drawing Device, the assembly is installed in the PPS Cutting and Drawing Stations, represented in FIGS. 11 to 14, to be implanted in Onshore Bases (Spoolbases) (11), Type J (J Lay) (12) Launch Vessels, and Type S (S Lay) Launch Vessels (13), for the Construction and Installation of Subsea Pipelines (Subsea or Submerged Pipelines), and at the Pipe Sites (14), for Onshore Pipelines (Buried Pipelines).

11 Claims, 8 Drawing Sheets

(56) References Cited

U.S. PATENT DOCUMENTS

| | | | | |
|---|---|---|---|---|
| 3,067,651 | A * | 12/1962 | Hogden | B23B 5/162<br>144/205 |
| 3,443,648 | A | 5/1969 | Howard | |
| 3,600,990 | A * | 8/1971 | Renoux | B23Q 7/05<br>193/38 |
| 3,691,882 | A * | 9/1972 | Massey | B23B 5/163<br>82/113 |
| 3,704,639 | A * | 12/1972 | Foss | B23B 5/162<br>144/205 |
| 3,717,055 | A * | 2/1973 | Pendleton | B23B 5/162<br>82/113 |
| 3,733,939 | A * | 5/1973 | Paysinger | B23B 5/162<br>144/205 |
| 3,987,523 | A * | 10/1976 | Nelson | B23K 33/004<br>82/1.11 |
| 3,995,466 | A * | 12/1976 | Kunsman | B21D 17/04<br>72/370.21 |
| 4,126,065 | A * | 11/1978 | Clavin | B23B 5/162<br>144/205 |
| 4,149,436 | A * | 4/1979 | Blattler | B23B 5/163<br>144/205 |
| 4,343,207 | A | 8/1982 | Paysinger | |
| 4,345,376 | A | 8/1982 | Benson et al. | |
| 4,437,366 | A * | 3/1984 | Astle | B23B 5/162<br>82/113 |
| 4,465,422 | A * | 8/1984 | Blust, Sr. | B23Q 1/76<br>74/606 R |
| 4,576,070 | A | 3/1986 | Fitzgerald | |
| 4,791,716 | A * | 12/1988 | Konrad | F16L 19/10<br>29/520 |
| 5,209,094 | A | 5/1993 | Edmonds, Jr. | |
| 5,361,659 | A | 11/1994 | Hanson | |
| 5,424,846 | A * | 6/1995 | Bornhorst, Jr. | B23B 31/1622<br>358/3.32 |
| 5,605,083 | A * | 2/1997 | Lupke | B23D 21/04<br>82/67 |
| 5,946,993 | A * | 9/1999 | Flanagan | B23Q 7/006<br>82/127 |
| 6,050,161 | A * | 4/2000 | Tremblay | B23B 5/162<br>82/132 |
| 6,189,424 | B1 * | 2/2001 | Wheeling | B23Q 11/005<br>82/127 |
| 7,429,153 | B2 | 9/2008 | Dole et al. | |
| 7,574,807 | B1 | 8/2009 | Fuller | |
| 8,220,371 | B2 * | 7/2012 | Benson | B23B 5/162<br>30/96 |
| 8,720,070 | B2 | 5/2014 | Sterner | |
| 8,827,607 | B1 * | 9/2014 | Goodman | B23B 5/168<br>408/202 |
| 10,022,801 | B1 * | 7/2018 | Devaney | B23B 5/08 |
| 10,393,368 | B2 | 8/2019 | Smith | |
| 10,464,144 | B2 * | 11/2019 | Choi | B23C 3/122 |
| 10,625,345 | B1 * | 4/2020 | Castille | B23B 5/163 |
| 10,821,621 | B2 * | 11/2020 | Breyer | B26D 3/166 |
| 2007/0028451 | A1 * | 2/2007 | Kaehr | B23B 5/16<br>30/102 |
| 2010/0257981 | A1 * | 10/2010 | Frick | B23B 5/162<br>407/120 |
| 2011/0041658 | A1 * | 2/2011 | Weinberg | B23B 5/162<br>82/113 |
| 2011/0108149 | A1 | 5/2011 | Xiao | |
| 2011/0167887 | A1 * | 7/2011 | Lee | B23B 5/168<br>72/70 |
| 2012/0017377 | A1 | 1/2012 | Hayden | |
| 2012/0308321 | A1 * | 12/2012 | Onishi | G21C 17/017<br>408/81 |
| 2013/0061726 | A1 * | 3/2013 | Katsu | B23B 3/06<br>82/121 |
| 2014/0041492 | A1 * | 2/2014 | Phillips, II | B23B 3/26<br>82/113 |
| 2014/0260840 | A1 * | 9/2014 | Mori | B23B 3/26<br>82/113 |
| 2015/0090083 | A1 * | 4/2015 | Conrad | B26D 3/06<br>82/47 |
| 2015/0174661 | A1 * | 6/2015 | Brandstrom | B23K 37/0276<br>228/9 |
| 2015/0298214 | A1 * | 10/2015 | Arkwright | B23B 5/167<br>82/1.11 |
| 2015/0321259 | A1 * | 11/2015 | Weinberg | B23B 5/162<br>82/113 |
| 2016/0271702 | A1 * | 9/2016 | Karpachevskyy | B23B 3/26 |
| 2018/0056408 | A1 * | 3/2018 | Coakley | B23B 5/14 |
| 2019/0126367 | A1 * | 5/2019 | Tripp | B23B 5/16 |
| 2019/0143430 | A1 * | 5/2019 | Kundracik | B23G 1/24<br>82/1.11 |
| 2019/0160544 | A1 * | 5/2019 | Karpachevskyy | B23B 5/16 |
| 2019/0160604 | A1 * | 5/2019 | Weinberg | B23B 5/08 |
| 2019/0277330 | A1 * | 9/2019 | Pattok | B21J 5/12 |
| 2019/0337107 | A1 * | 11/2019 | Onushko | B23Q 1/64 |
| 2020/0139447 | A1 * | 5/2020 | Kimura | B29C 37/04 |
| 2020/0200004 | A1 | 6/2020 | Wang | |
| 2020/0276659 | A1 * | 9/2020 | Coakley | B26D 3/16 |
| 2021/0129228 | A1 * | 5/2021 | Pechstein | B23B 27/065 |
| 2021/0394315 | A1 * | 12/2021 | Garza, Jr. | B25B 1/20 |
| 2023/0339132 | A1 * | 10/2023 | Monteiro | B26D 1/43 |
| 2023/0364819 | A1 * | 11/2023 | Monteiro | B26D 1/04 |
| 2023/0381873 | A1 | 11/2023 | Monteiro et al. | |

FOREIGN PATENT DOCUMENTS

| | | | | |
|---|---|---|---|---|
| CN | 110802241 | A * | 2/2020 | |
| CN | 113102784 | A * | 7/2021 | |
| CN | 113798522 | A * | 12/2021 | B23B 5/08 |
| DE | 20000092 | U1 | 3/2000 | |
| DE | 20209579 | U1 | 10/2003 | |
| DE | 202020101282 | U1 | 3/2020 | |
| EP | 0 164 097 | | 12/1985 | |
| FR | 2333625 | | 7/1985 | |
| GB | 1392637 | | 4/1975 | |
| GB | 2473741 | | 3/2011 | |
| IT | BO20130698 | A1 * | 6/2015 | B23Q 9/02 |
| JP | 60141404 | A * | 7/1985 | |
| JP | 2747523 | | 5/1998 | |
| KR | 101067711 | | 9/2011 | |
| KR | 101787684 | B1 | 10/2017 | |
| RU | 180973 | U1 | 7/2018 | |
| WO | WO 93/002825 | | 2/1993 | |
| WO | WO 2012130361 | | 10/2012 | |
| WO | WO-2018164244 | A1 * | 9/2018 | F27B 7/22 |

* cited by examiner

STATIONARY CUTTING MACHINE AND METHODS OF CUTTING AND DRAWING THE PIPE PRESERVATION SYSTEM

FIELD OF THE INVENTION

The present invention refers to the field of Pipeline Systems, which encompasses Subsea or Submerged Pipelines, in salt or fresh water, and Buried or Onshore Pipelines (Buried Pipelines), for application in the field of Oil and Gas, Mining, Sanitation, Water Supply and others, which use externally coated carbon steel pipes for anticorrosive protection (External Anticorrosive Coating), in three layers of polyethylene (PE) or Polypropylene (PP) (3-Layer PE or 3-Layer PP Coating), more specifically it relates to a machine that cuts the external coating for removing the Coated Pipe Preservation System for Onshore and Subsea Pipelines, called, in short, the PPS System, or known by the acronym PPS.

DESCRIPTION OF THE STATE OF THE ART

The carbon steel pipes, when installed in salt or fresh water, called Subsea or Submerged Pipelines, or onshore, called Buried or Onshore Pipelines (Buried Pipelines), require external anticorrosion protection (External Anticorrosive Coating). In this specific case, it is a Polyethylene coating in three layers (3-Layer PE Coating) and Polypropylene in three layers (3-Layer PP Coating), the former being used in Onshore Pipelines and the latter in Subsea Pipelines. The term Three Layers (3-Layer) corresponds to the 3-Layer PE Coating, a first layer of thermally curable Epoxy powder (FBE—Fusion Bonded Epoxy), a second layer of Copolymer Adhesive, and a third layer of Polyethylene (PE). For the 3-Layer PP Coating, the same first and second layers as for the 3-Layer PE Coating are used; however, the third layer is Polypropylene (PP). An easy way to identify them is by the color of the external coating: in general, Polyethylene (PE) is manufactured in black and Polypropylene in white.

The external anticorrosive coating of steel pipes in three layers for onshore and subsea pipelines is manufactured in coating plants installed in Brazil, in accordance with Brazilian standards ABNT NBR 15221-1: External Anticorrosive Coating—Part 1: Polyethylene in three layers and ABNT NBR 15221-2: External Anticorrosive Coating—Part 2: Polypropylene in three layers. Abroad, the standard applied in most countries is ISO 21809-1—Petroleum and Natural Gas Industries, External Coating for Buried and Submerged Pipelines used in Pipeline Transportation Systems—Part 1—Polyolefin Coatings (3-Layer PE and 3-Layer PP).

The aforementioned Brazilian Standards define in Item 3.6, Collar (Cutback) as: "Extensions of the pipes, from the face of the bevel to the polyethylene or polypropylene, located at both ends, which are left free of coating". The Collar (Cutback), represented in FIG. 2 (2.2), has the main purpose of ensuring that the heat input generated during the welding of the joint that joins 2 (two) pipes does not damage its external coating. It is additionally intended for the coupling of the semi-automatic or automatic welding machine, the ultrasound equipment, in addition to being the scanning area for inspection of the weld. The FBE Exposure Band (FBE Tail), represented in FIG. 2 (2.3), is intended to mitigate coating detachment at the steel/coating interface and promote an overlap of the field joint coating system. The chamfer angle (β), represented in FIG. 2 (2.4), is the angle in relation to the surface of the pipe, in the longitudinal direction, in order to allow the correct accommodation of the field joint. As can be seen, the Collar (Cutback) only needs and must be exposed at the time of coupling for the welding.

The essential condition, required by current standards and specifications, is that the Chamfer of the Collar (Cutback), represented in FIG. 2 (2.4), after cutting, is at the correct angle (β), less than 30°, and its Length (C), represented in FIG. 2 (2.6), is in the specified measure, the standard being defined in the aforementioned Brazilian Standards of 120±10 mm. However, the buyer can specify longer or shorter and even different lengths at one end and the other. The FBE Exposure Band (FBE Tail), represented in FIG. 2 (2.3), when specified by the buyer, must ensure that the entire layer of Copolymer Adhesive (second layer) is removed without causing damage to the FBE layer, in the specified width (T), represented in FIG. 2 (2.7). The Width (T) of this Band varies according to the specifications of the buyers, with some from 1 to 5 mm and others from 5 to 20 mm in width.

The current practice continues to be the making of the Collar (Cutback), represented in FIG. 2 (2.2), by the brushing method. The Pipe is coated in its entirety and, at the end of the production line, its ends are brushed, removing all three layers of the applied external coating, eliminating the roughness profile obtained in the blasting process, carried out by two blasting machines, generating waste (of low added value for recycling), noise, dust, and projection of wires from the steel brushes in a process that is often a bottleneck in the production line. The cost of frequent replacement of the steel brush pack used in the process is relevant. In addition, after all this process, there is machined the FBE Exposure Band (FBE Tail), represented in FIG. 2 (2.3), at each end of the pipes, adding more time and cost to the process.

The manufacturing of the Collar (Cutback) (2.2) by the brushing method, with regard to the finish of its chamfer, has two disadvantages: the first concerns the process, which is very aggressive, frays the coating and causes stresses, which when added to the thermal stresses generated in the coating process, rapid heating and cooling, result, over time, in the detachment of the coating in the transition region, coating and Collar (Cutback) (2.2). The second disadvantage is that the surface is not uniform, preventing a correct accommodation of the field joint. When pipes are stored in open-air, without an effective protection by the Collar (Cutback), this phenomenon tends to intensify, due to variations in temperature and humidity, since each layer of the coating and the pipe have different coefficients of expansion and will move searching for stabilization, which will cause the coating to peel off, allowing oxygen to enter under the FBE layer, initiating the corrosive process. The FBE Exposure Band (FBE Tail), represented in FIG. 2 (2.3), made by machining, after brushing, aims at mitigating this problem and ensure the overlap of the field joint in the region, in order to make a smooth transition, avoiding void spaces that could favor the entry of oxygen, initiating the corrosion process, or causing loss of efficiency in the cathodic protection system. However, as the machining is done soon after coating and brushing the Pipe, the stresses remain, and the layers will tend to move over time. For this reason, the term mitigate was used.

In order to solve the problem of brushing and to preserve and protect the ends of the pipes, the Preservation System of Coated Pipes for Onshore and Subsea Pipelines was created, called for short PPS System or simply PPS. This System and Method, protected by document BR102019015918-9 A2, represented in section in FIG. 1, preferably encompasses carbon steel pipes externally coated with Polyethylene in three layers (3-Layer PE) and Polypropylene in three layers (3-Layer PP), with Outer Diameter (OD) (1.13), ranging from 114.3 to 812.8 mm (4½ to 32 inches) and with Wall Thicknesses (eP) (1.11), ranging from 6.35 to 50.8 mm (¼ to 2 inches). To achieve such an objective, the system is made up of the following elements: a Cup (1.1), a Seal (1.2), a Cover (1.3), and the External Coating (1.4), so that all components will be inserted along the coating method.

Said system promotes the increase in the useful life of coated pipes, when they are stored in the environment (in open-air), in addition to reducing the assembly time, resulting in savings in construction and installation costs. Accordingly, the technical advantages obtained have direct or indirect effects on the manufacturing, storage and assembly process, eliminating recurrent losses due to corrosion during storage, reducing the cost of the blasting process in the field, eliminating the Collar (Cutback) brushing operation at the factory, reducing the time to prepare the Collar (Cutback) surface, consequently reducing the bottleneck in releasing the joints in the field, mitigating the environmental impact and reducing the blasting time in the field or on the vessel. In this context, it is necessary to use efficient, low-cost and reliable Cutting Machines to ensure the effectiveness of the PPS System, the objective of this invention. Following this logic, it is concluded that the use of the PPS Stationary Cutting Machine, the PPS Automated Drawing Device, and the PPS Cutting and Drawing Stations will contribute to obtaining gains in productivity, economics, reliability, safety, and environmental issues provided for in document BR102019015918-9 A2.

With the elimination of brushing the Collar (Cutback) of coated pipes proposed in the aforementioned document, there is a need to develop a machine that cuts the coating to remove the PPS System. This cut must meet the angle required by the standard and guarantee the FBE Exposure Band (FBE Tail), when specified by the buyer. In addition, it must meet productivity requirements, being faster and more economical than the activities it will eliminate or replace.

There are several means for machining the coating and executing the FBE Exposure Band (FBE Tail). The difference is that there is a need for a specific machine to accurately and quickly cut and draw the PPS System, in straight rotating Pipes in the field, for the Construction and Assembly of Onshore Pipelines (Buried Pipelines), or in the Vessel or Onshore Base (Spoolbase), for the Construction and Installation of Subsea Pipelines (Subsea or Submerged Pipelines), without causing damage to the pipe surface or to the FBE (Fusion Bonded Epoxy) layer.

Document WO1993002825A1 addresses to a pipe cutter used particularly for non-metallic pipes, said cutter being designed not to cause deformations in the pipe during the cut. The cutter has an attachment sleeve, a cutting assembly which is capable of rotating a guide sleeve, and three support legs connected to the attachment sleeve. It is said that the attachment sleeve is divided into two parts, so that it can be opened to receive a pipe to be cut and closed to clamp the pipe to be cut. Furthermore, the cutting assembly has a blade and means for adjusting the cutting depth of the pipe, said cut being performed by the rotating movement of the cutting assembly.

Document U.S. Pat. No. 7,429,153B2 discloses a tool for cutting a chamfer on a pipe end, said tool comprising a housing, a ring positioned inside the housing, a slot in said ring forming a pair of ends, a cutting edge positioned at one end, and a thrust flange.

Document U.S. Ser. No. 10/464,144B2 discloses a pipe cutting and chamfering machine comprising a main body portion with a central portion through which a pipe passes to be attached, a cutting unit coupled to the main body portion and configured to cut or chamfering the pipe by means of a cutting blade while the cutting unit is orbiting around the attached pipe, an inlet adjustment plate coupled to the cutting unit, an inlet control unit configured to perform movement of the inlet adjustment plate.

The mentioned documents of prior art disclose devices used in pipe cutting; however, none of them are capable of perform satisfactorily in pipelines with the Coated Pipe Preservation System for Onshore and Subsea Pipelines.

The Coated Pipe Preservation System for Onshore and Subsea Pipelines (PPS), protected in document BR102019015918-9 A2, called the PPS System, is unprecedented, and for this reason the Cutting Machine described in this invention as well, since the System foresees the cut for its removal and that Machine is designed for that purpose. There are several apparatuses, devices and machines for machining the FBE Exposure Band (FBE Tail); however, all use the Collar (Cutback) brushed or obtained by masking adhesive tape. In both cases, the machining of the external coating starts from the end of the pipe towards the center, being performed only by the manufacturer (coater).

In view of the difficulties present in the abovementioned State of the Art, and for cutting solutions and PPS cutting and drawing methods, there is a need to develop a technology capable of performing effectively and that is in accordance with environmental and safety guidelines. The referenced documents do not have the unique features that will be presented in detail below.

Objective of the Invention

It is an objective of the present invention to cut the coating of carbon steel pipes, make the FBE Exposure Band (FBE Tail) (2.3), and draw the PPS System, faster and more economically than the methods currently used.

BRIEF DESCRIPTION OF THE INVENTION

The present invention relates to a machine and a device created to Cut the Coating and Draw the PPS System of Straight Pipes externally coated in Polyethylene in three layers (3-Layer PE) and Polypropylene in three layers (3-Layer PP), which rotate during cutting, at the Pipe Site, for Onshore Pipelines (Buried Pipelines), in the Vessel or in the Onshore Base (Spoolbase) of Subsea or Submerged Pipelines. The invention additionally relates to Methods to be adopted at the PPS Cutting and Drawing Stations. There follows a brief description of the scope of this invention, which includes the PPS Stationary Cutting Machine, the PPS Automated Drawing Device, the Physical Arrangements (Layouts), and the Methods for implantation in the PPS Cutting and Drawing Stations in Construction and Assembly of Onshore Pipelines (Buried Pipelines) and Construction and Installation of Subsea Pipelines (Subsea or Submerged Pipelines).

The Cutting Device of the pipe preservation system, called PPS Cutting Device for short, is installed on the machine bar for cutting the coating, and is illustrated in FIGS. 3 to 6, and is protected by document BR 10 2022 007711-8.

The PPS Stationary Cutting Machine, represented in FIGS. 7 and 8, performs the cut at an angle in relation to the outer surface of the Pipe coating, in the longitudinal direction, and makes the FBE Exposure Band (FBE Tail) (FIG. 2 (2.3)), in order to ensure that the Collar (Cutback) (FIG. 2 (2.2)) meets the specifications regarding the finishing at the interface with the Pipe External Coating, being applicable to straight pipes, which rotate during the cut of the external coating.

Two machines are used, one at each end of the pipe, to make simultaneously the cut, gaining in productivity. Each Machine has a stop that uses the end ("Nozzle") of the component PPS System Cup (FIG. 1 (1.1)), as a reference, ensuring the correct positioning of the cut, facing the end of the External Flap of this component, represented in FIG. 3 (3.10). The Machine in question can be fully automated or semi-automated.

The PPS Automated Drawing Device, represented in FIGS. 9 and 10, executes the drawing and/or repositioning of the PPS System after cutting in an automated or semi-automated way. The drawing is done through a Mechanism (9.4) that couples to the Cover (9.5) of the PPS System (9.6) in an automated way. This Device uses the same reference element as the PPS Stationary Cutting Machine to accurately position itself. It is presented in this invention as an option to gain in productivity and safety, since the drawing and repositioning of the PPS System (10.1) can be manually done, through the Cover (9.5), as long as the Pipe is immobilized.

Completing the scope of the invention, the PPS Cutting and Drawing Stations are presented as part of the Methods, represented in FIGS. 11 to 14, which describe the entire process, including the Physical Arrangement (Layout) for the implantation of these Stations in Onshore Bases (Spoolbases), in Type J (J Lay) and S (S Lay) Launching Vessels, for the installation of Subsea or Submerged Pipelines and at the Pipe Site, for Construction and Assembly of Onshore Pipelines (Buried Pipelines). Additionally, it describes an option for the installation of subsea pipelines by Methods J and S (J and S Lay), which will be at the discretion of the installer.

BRIEF DESCRIPTION OF THE DRAWINGS

The present invention will be described in more detail below, with reference to the attached Figures which, in a schematic way and not limiting the inventive scope, represent examples of its embodiment. In the drawings, there are:

1—FIG. 1 representing a section view of the PPS System, comprising the Cup (1.1), the Seal (1.2), the Cover (1.3), the External Coating (1.4), the Cutting Position and the respective Angle (β) (1.5), the Bevel (1.6), the Pipe Wall (1.7), the Length (A) of the Cup External Flap (1.8), the Length (C) of the Collar (Cutback) (1.9), the Width (T) of the FBE Exposure Band (FBE Tail) (1.10), the Thickness (eP) of the Pipe Wall (1.11), the Total Thickness (eR) of the Coating (1.12), the Outer Diameter (OD) (1.13) of the Pipe, and the Internal Diameter (ID) (1.14) of the Pipe;

Figure 2:
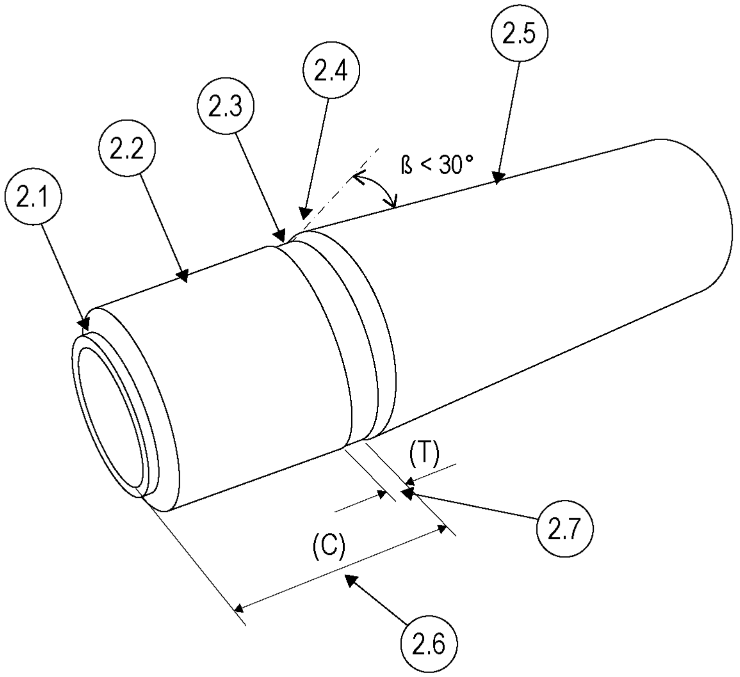
Figure 3:
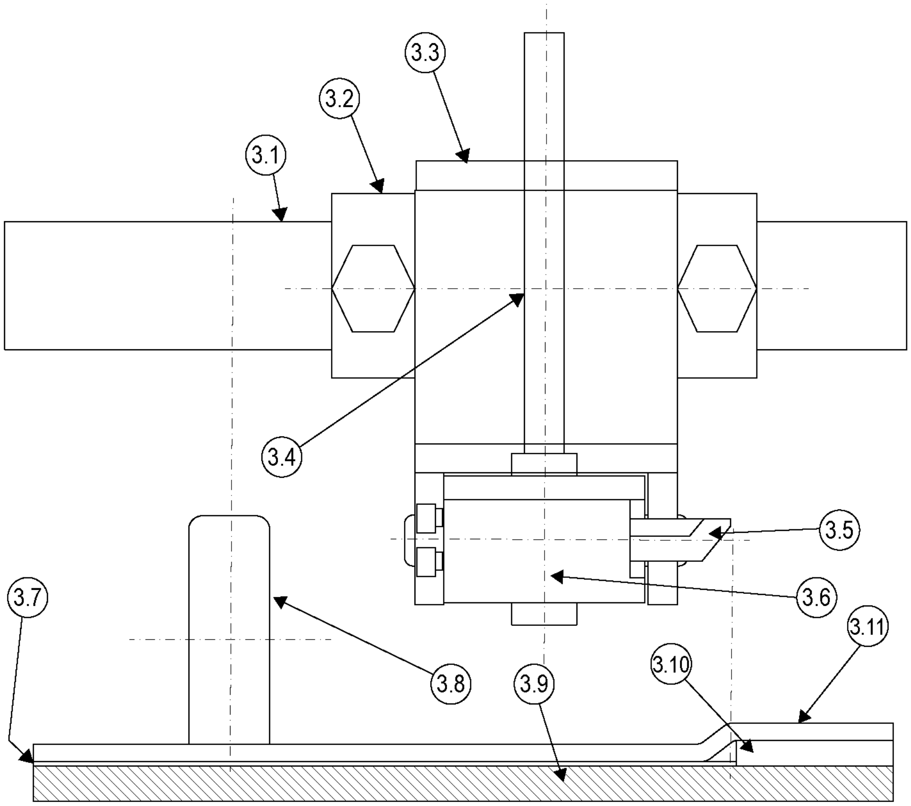
Figure 4:
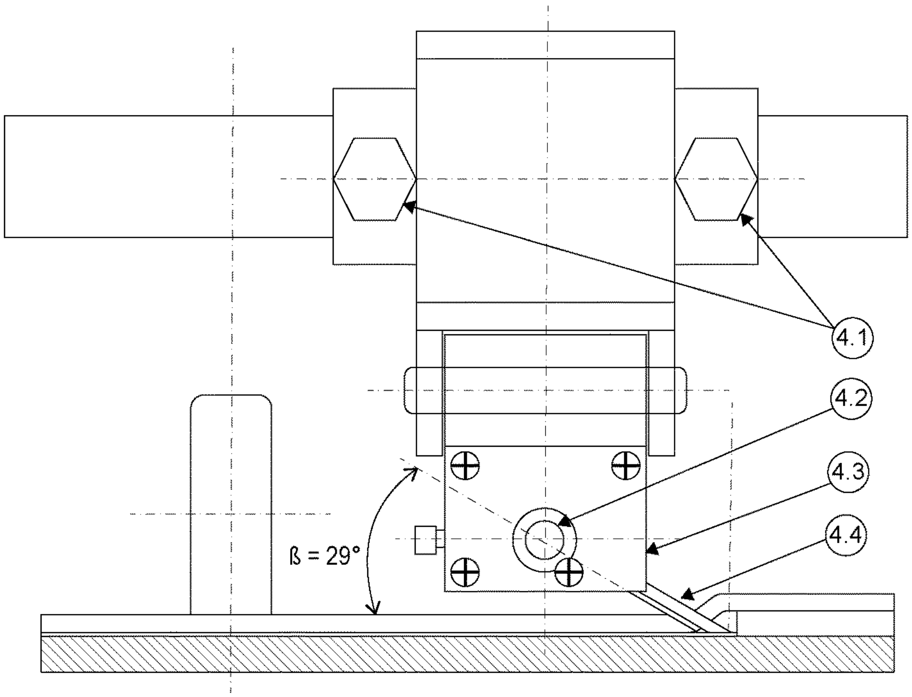
Figure 5:
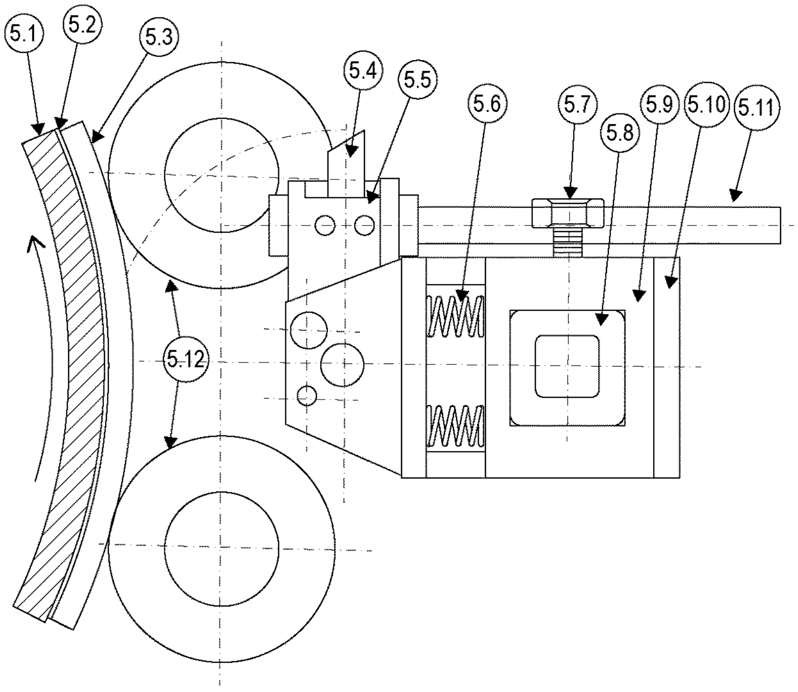
Figure 6:
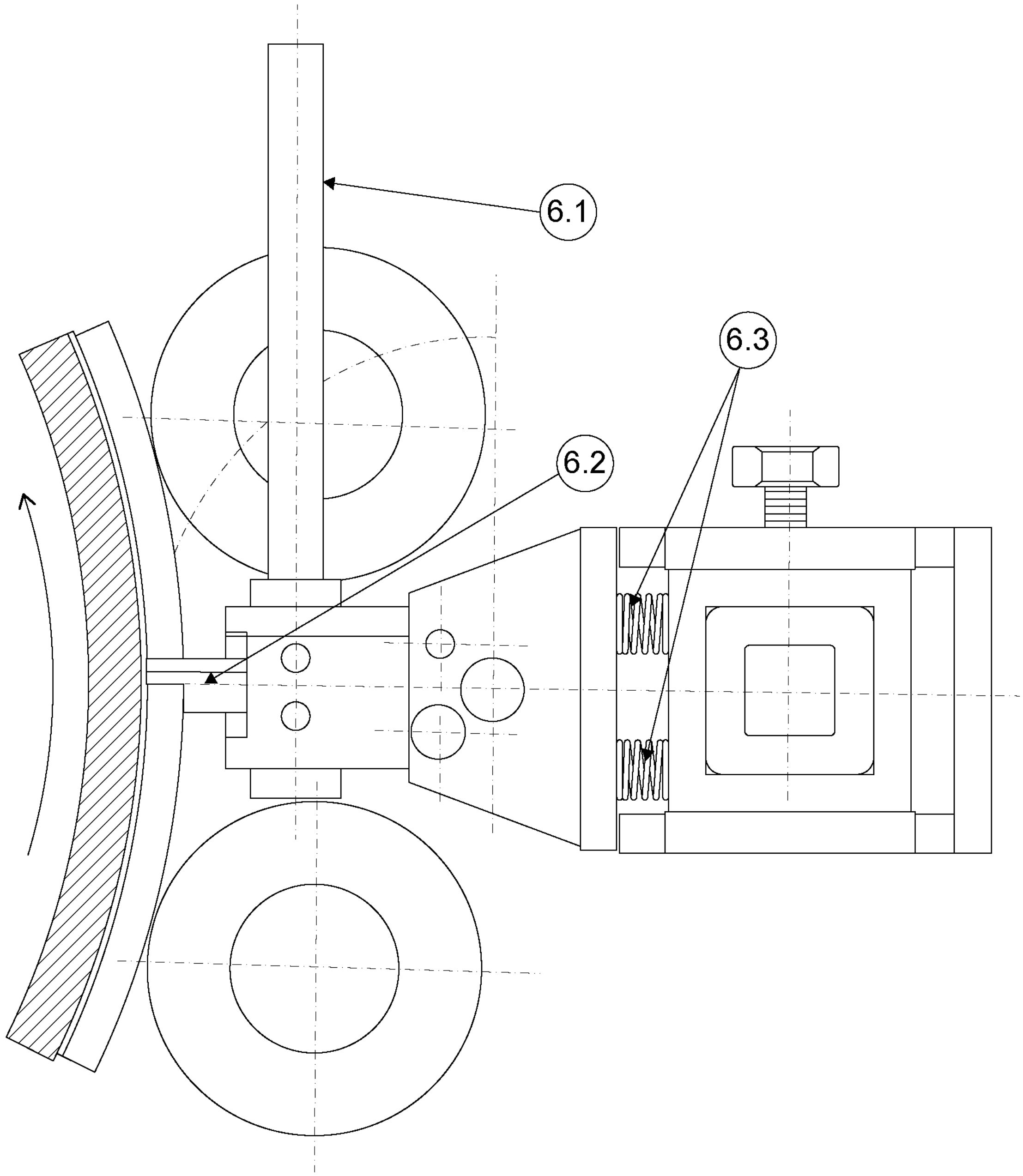
Figure 7:
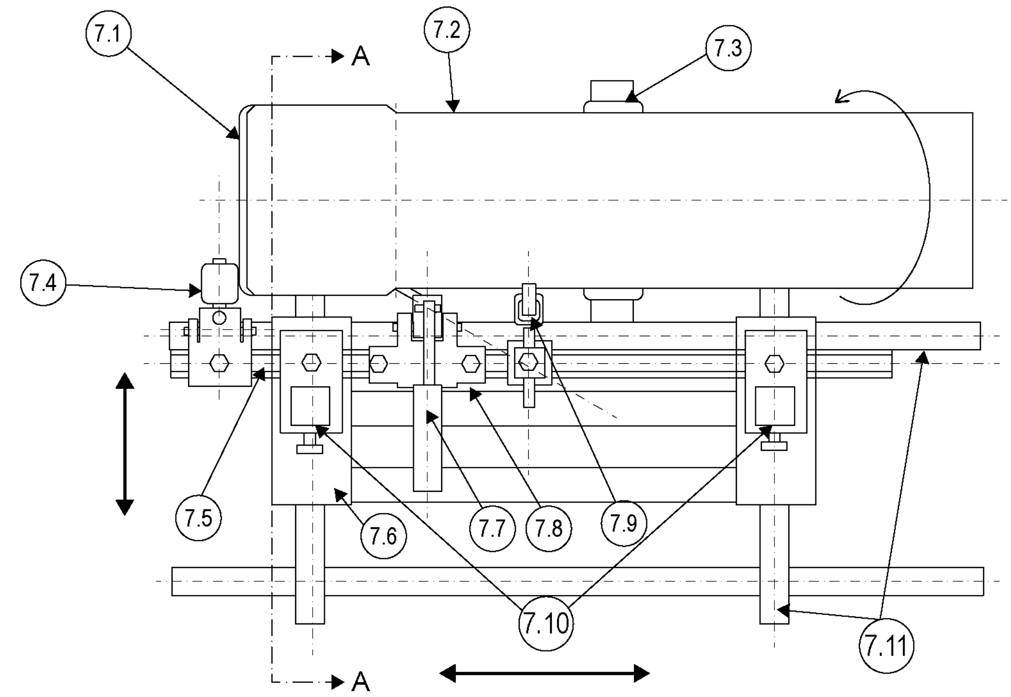
Figure 8:
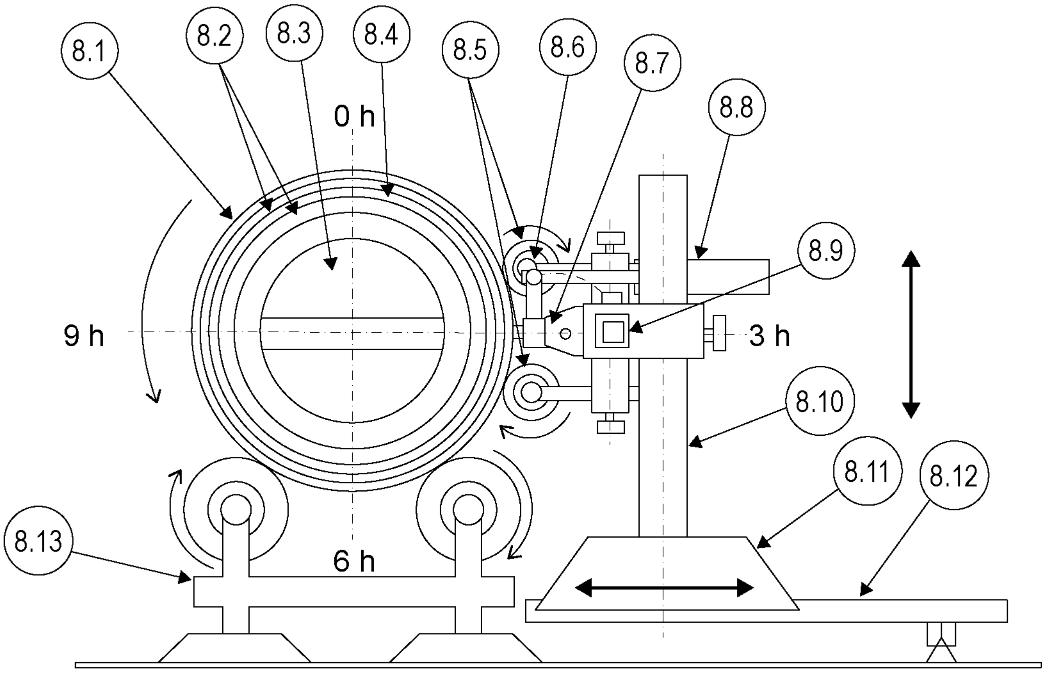
Figure 9:
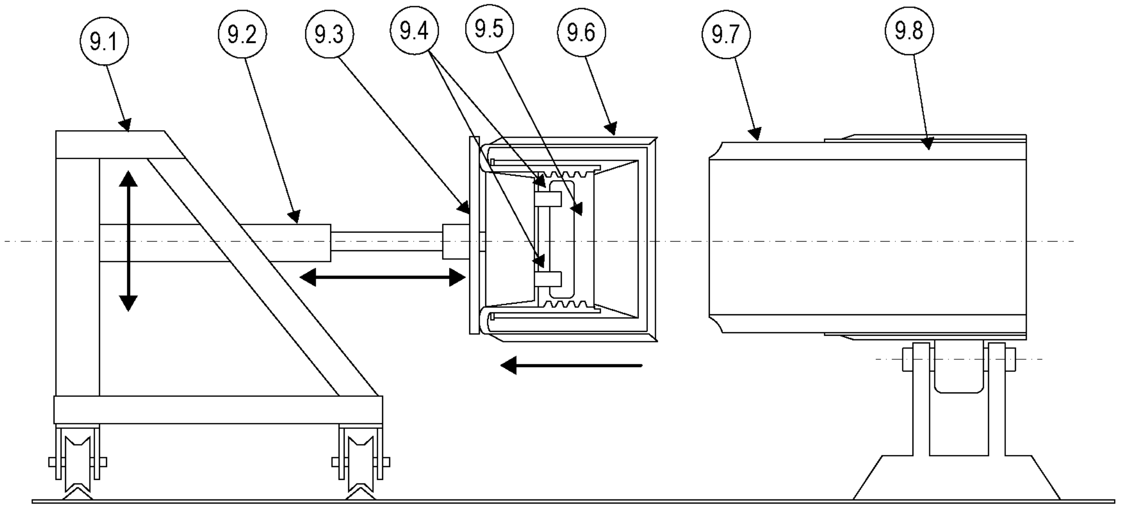
Figure 10:
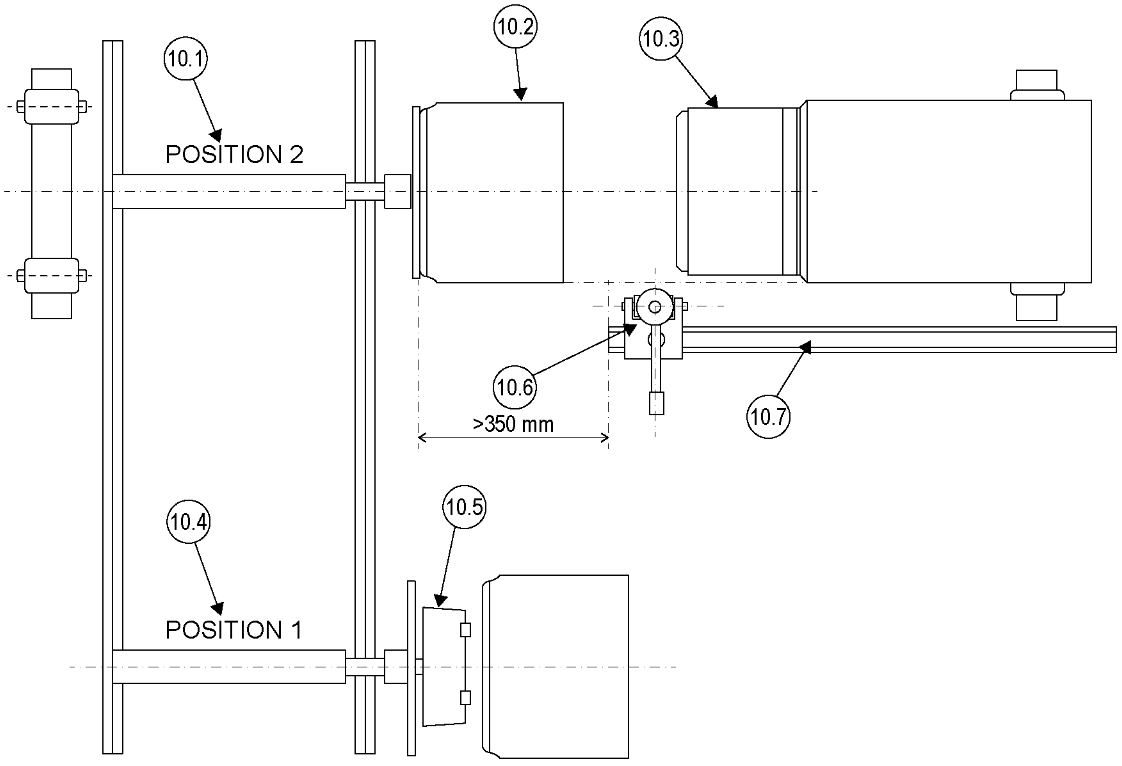
Figure 11:
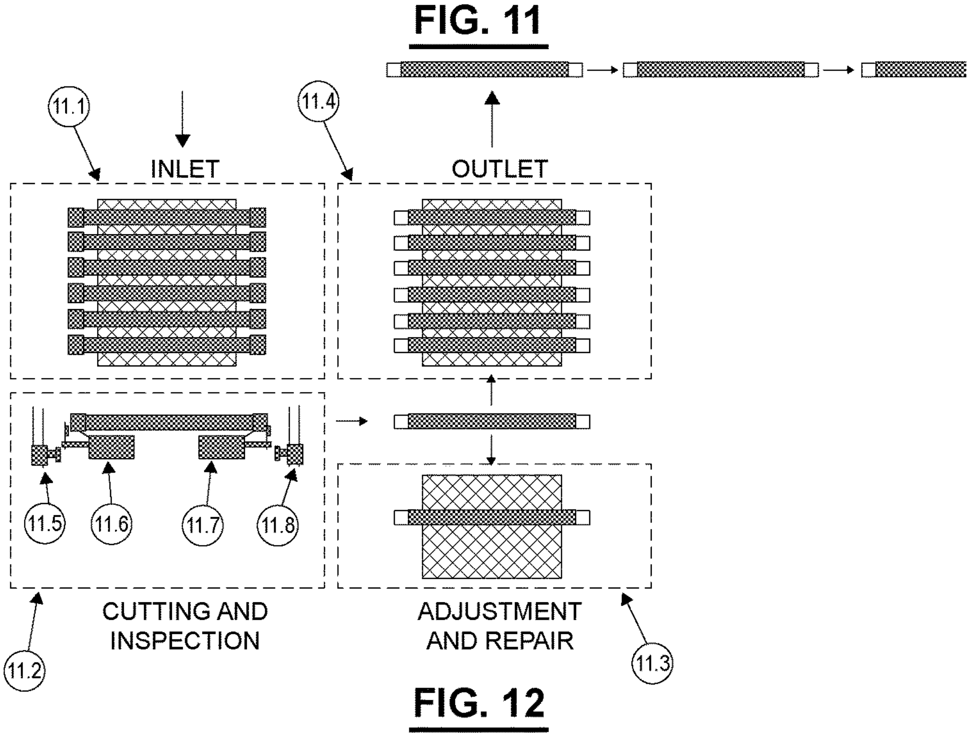
Figure 12:
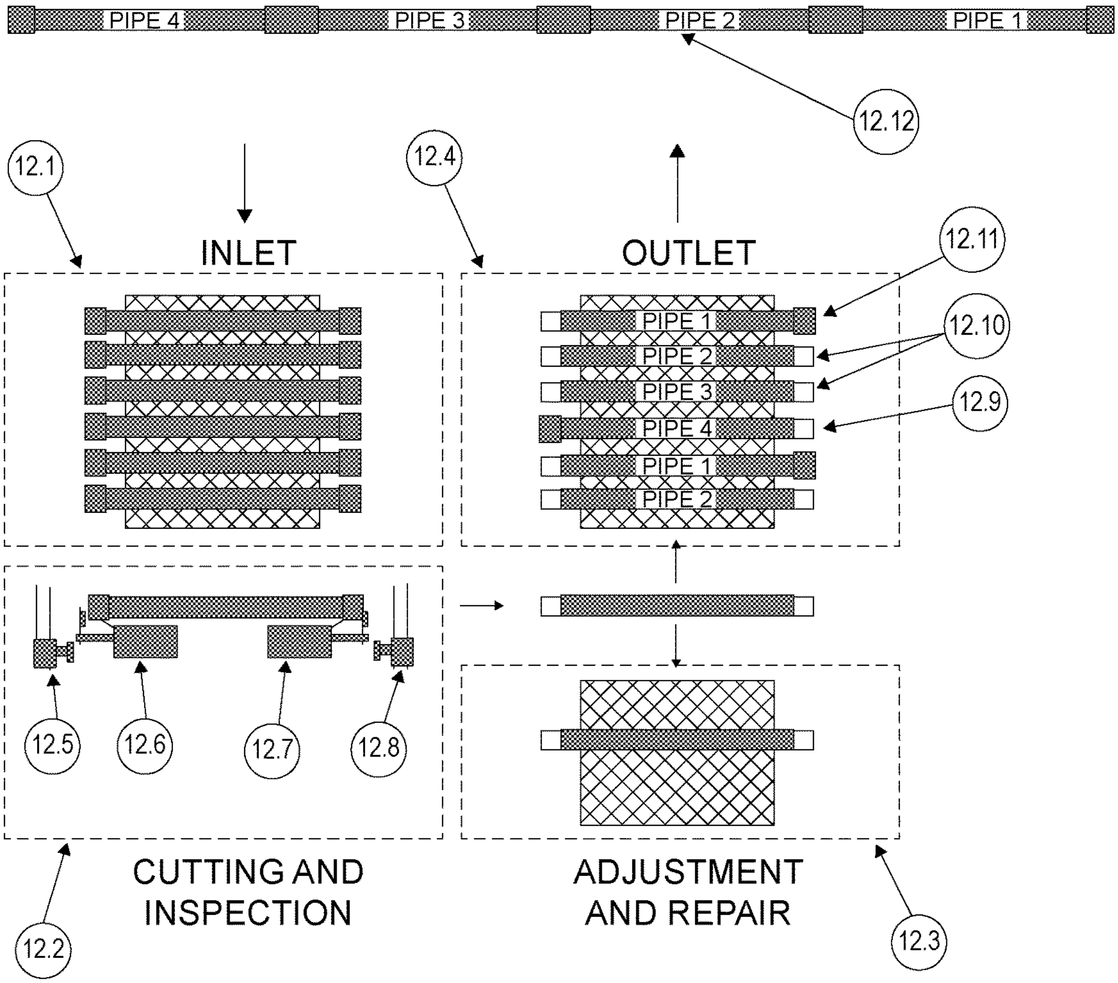
Figure 13:
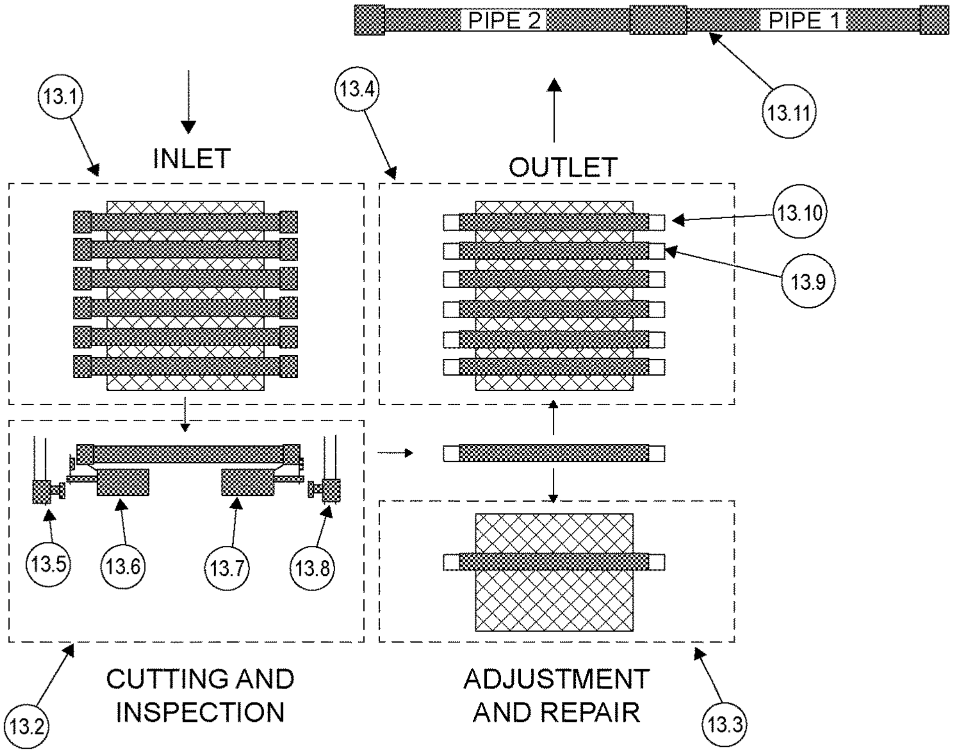
Figure 14:
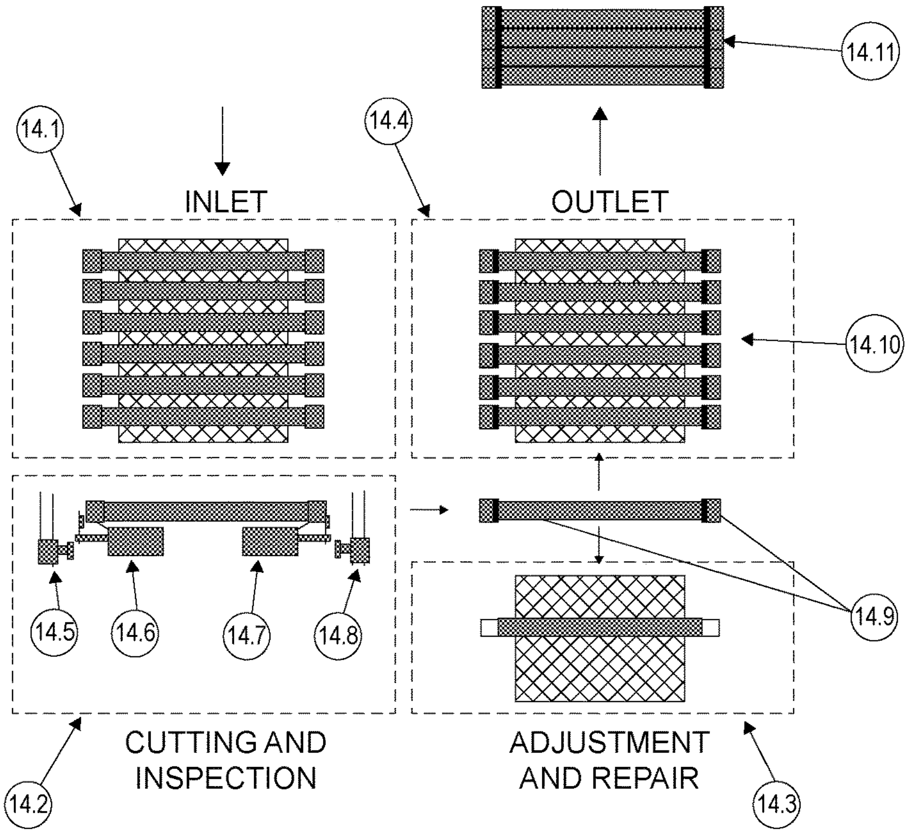

2—FIG. 2 representing the Collar (Cutback) of a pipe externally coated in three layers (3-Layer Coating), comprising the Bevel (2.1), the Collar (Cutback) (2.2), the FBE Exposure Band (FBE Tail) (2.3), the Collar (Cutback) Chamfer (2.4), the External Coating (2.5), the Length (C) (2.6) of the Collar (Cutback) (2.2), and the Width (T) (2.7) of the FBE Exposure Band (FBE Tail) (2.3);

3—FIG. 3 representing the front view of the PPS Cutting Device, protected by document BR 10 2022 007711-8, with the PPS Cutting Blade (3.5) in the retracted position, which comprises the Bar (3.1), the Adjustment Guide (3.2), the Body (3.3), the PPS Cutting Lever (3.4), the PPS Cutting Blade (3.5), the PPS Cutting Blade Receptacle (3.6), the Epoxy Layer (FBE) (3.7), the Support Wheel (3.8), the Pipe Wall (3.9), the end of the External Flap of the Cup (3.10) and the External Coating to be cut (3.11);

4—FIG. 4 representing a front view of the PPS Cutting Device, protected by document BR 10 2022 007711-8, with the PPS Cutting Blade in the cutting position, which comprises the Cutting Position Setting Screws (4.1), the PPS Cutting Lever (4.2), the PPS Cutting Blade Receptacle (4.3), and the PPS Cutting Blade (4.4);

5—FIG. 5 representing a side view of the PPS Cutting Device, protected by document BR 10 2022 007711-8, with the PPS Cutting Blade in the Retracted Position, comprising the Pipe Wall (5.1), the First Layer of Epoxy (FBE) (5.2), the Pipe External Coating (5.3), the PPS Cutting Blade (5.4), the PPS Cutting Blade Receptacle (5.5), the Adjustment Springs (5.6), the Cutting Position Setting Screw (5.7), the Bar (5.8), the Adjustment Guide (5.9), the Body (5.10), the PPS Cutting Lever (5.11), and the Support Wheels (5.12);

6—FIG. 6 representing a side view of the PPS Cutting Device, protected by document BR 10 2022 007711-8, with the Blade in the Cutting Position, comprising the PPS Cutting Lever (6.1), the PPS Cutting Blade (6.2), and the Adjustment Springs (6.3), all in the coating cutting position;

7—FIG. 7 representing the Top View of the PPS Stationary Cutting Machine, which comprises the End ("Nozzle") of the Cup (7.1) of the PPS System, the Pipe (7.2), the Pipe Rotating Support (7.3), the Positioning Stop (7.4), the Bar (7.5), its Structure (7.6), the PPS Cutting Lever Drive Piston (7.7), the PPS Cutting Device (7.8), one of the Support Wheels (7.9), the Bar Support Columns (7.10 and 8.10), and the Base of its Structure (7.11);

8—FIG. 8 representing the Side View of the Stationary PPS Cutting Machine in section (SECTION A-A of FIG. 7), comprising the Pipe External Coating (8.1), the Cup (8.2) of the PPS System, the cover (8.3) of the PPS System, the Pipe Wall (8.4), the Support Wheels (8.5), the PPS Cutting Lever (8.6), the PPS Cutting Device (8.7), the PPS Cutting Lever Drive Piston (8.8), the Bar (8.9), the Bar Support Column (8.10), its Structure (8.11), its Base (8.12), and the Pipe Rotating Supports (8.13);

9—FIG. 9 representing the Side View of the PPS Automated Drawing Device, which comprises its Structure (9.1), the Piston (9.2), the Fitting Disc (9.3), the Coupling Jaws (9.4), the Cover (9.5), the PPS System (9.6), the Collar (Cutback) (9.7) and the Bevel exposed after cutting, for inspection, and the Pipe Wall (9.8);

10—FIG. 10 representing the Top View of the PPS Automated Drawing Device, which comprises the Position 2—Drawing/Repositioning of the PPS System (10.1), the drawn PPS System (10.2), the Collar (Cutback) (10.3) and the Bevel of the Pipe exposed for inspection, the Position 1—Retracted (10.4), the Fitting Disc (10.5), the Positioning Stop (10.6) in the Retracted Position, and the Bar (10.7) of the PPS Stationary Cutting Machine;

11—FIG. 11 representing the suggested Physical Arrangement (Layout) of the PPS Cutting Station on the Onshore Base (Spoolbase), for the installation of Subsea Pipelines, which comprises 4 (four) areas: Inlet (11.1), Cutting and Inspection (11.2), Adjustment and Repair (11.3), and Outlet (11.4). In the Cutting and Inspection area, there are installed the Left (11.5) and Right (11.8) PPS Automated Drawing Devices and the Left (11.6) and Right (11.7) PPS Stationary Cutting Machines;

12—FIG. 12 representing the suggested Physical Arrangement (Layout) of the PPS Cutting Station in a "J" type (J Lay) vessel for launching of a subsea pipeline, which comprises 4 (four) areas: Inlet (12.1), Cutting and Inspection (12.2), Adjustment and Repair (12.3) and Outlet (12.4). In the Cutting and Inspection area, there are installed the Left (12.5) and Right (12.8) PPS Automated Drawing Devices and the Left (12.6) and Right (12.7) PPS Stationary Cutting Machines, the Pipe 4, approved after Cutting and Inspection, with the PPS System repositioned at the Left End (12.9), the Pipes 2 and 3, approved after Cutting and Inspection, without the PPS System at both ends (12.10), the Pipe 1, approved after Cutting and Inspection, with the PPS System repositioned at the Right end (12.11) and the Column consisting of 4 (four) Pipes ready, with the ends protected by the PPS System, already cut and prepared for the drawing, before its lifting (12.12);

13—FIG. 13 representing the suggested Physical Arrangement (Layout) of the PPS Cutting Station on a "S" type (S Lay) vessel for launching of a subsea pipeline, which comprises 4 (four) areas: Inlet (13.1), Cutting and Inspection (13.2), Adjustment and Repair (13.3), and Outlet (13.4). In the Cutting and Inspection area, there are installed the Left (13.5) and Right (13.8) PPS Automated Drawing Devices and the Left (13.6) and Right (13.7) PPS Stationary Cutting Machines, the Pipe 2, approved after Cutting and Inspection, with the PPS System repositioned at the Left End (13.9), the Pipe 1, approved after the Cutting and Inspection, with the PPS System repositioned at the Right End (13.10), and the Column consisting of 2 (two) (Double Joint) Pipes ready, with the ends protected by the PPS System, already cut and prepared for drawing, before being introduced into the assembly line (13.11);

14—FIG. 14 representing the suggested Physical Arrangement (Layout) of the PPS Cutting Station at a Pipe Site of a Construction and Assembly work of an Onshore Pipeline comprising 4 (four) areas: Inlet (14.1), Cutting and Inspection (14.2), Adjustment and Repair (14.3) and Outlet (14.4). In the Cutting and Inspection area, there are installed the Left (14.5) and Right (14.8) PPS Automated Drawing Devices and the Left (14.6) and Right (14.7) PPS Stationary Cutting Machines, the Qualified Anti-Corrosion Protection Adhesive Tapes over the Cut (14.9), the Pipes approved after the Cutting and Inspection with the Qualified Anticorrosive Protection Tape over the cut (14.10) and 4 (four) Pipes ready for the passing on the Band (14.11).

DETAILED DESCRIPTION OF THE INVENTION

There follows below a detailed description of a preferred embodiment of the present invention, by way of example and in no way limiting. Nevertheless, it will be clear to a technician skilled on the subject, from reading this description, possible additional embodiments of the present invention still comprised by the essential and optional features below.

Figure 1:
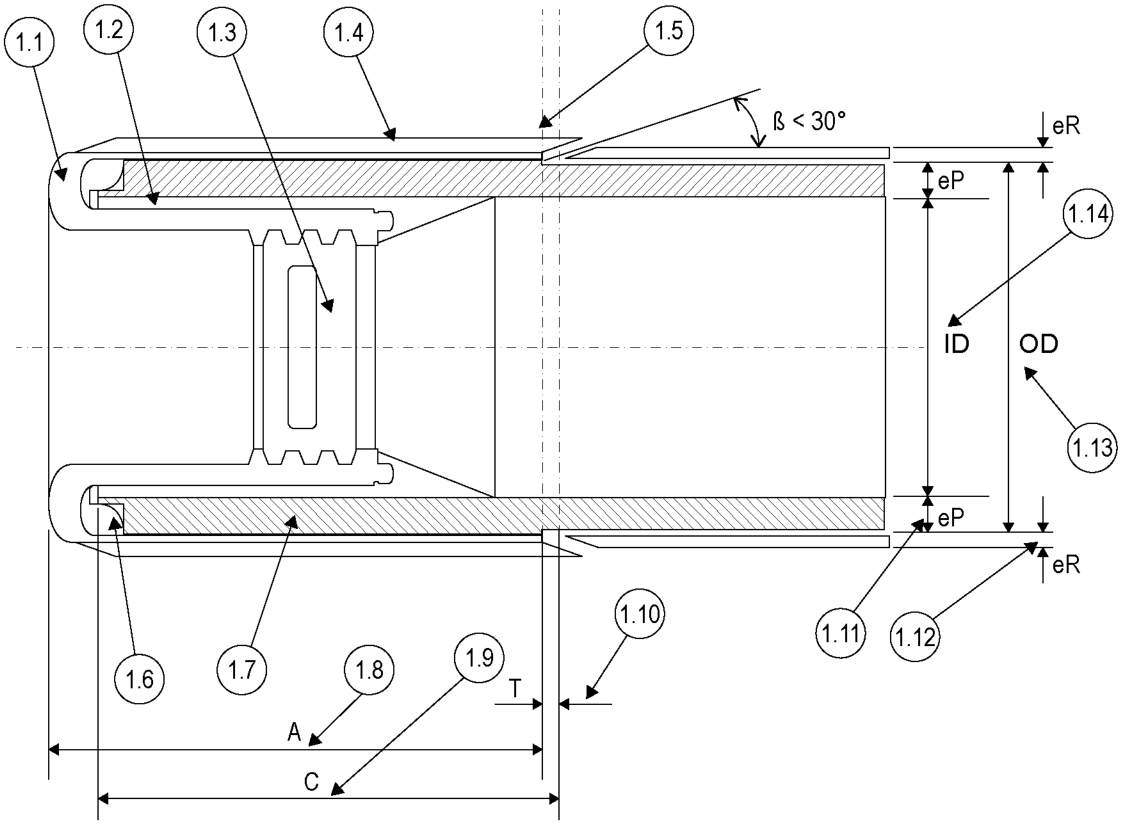

The present invention is applied to externally coated carbon steel pipes with their ends preserved and protected by the Coated Pipe Preservation System for Onshore and Subsea Pipelines, protected by document BR102019015918-9 A2, called, for short, PPS System or PPS, represented in FIGS. 1 (1.1), (1.2), (1.3) and (1.4), and refers to the PPS Stationary Cutting Machine, represented in FIGS. 7 and 8, to the PPS Automated Drawing Device, represented in FIGS. 9 and 10, and the PPS Cutting and Drawing Stations, illustrated in FIGS. 11 to 14, presented as Methods for the Installation of Subsea Pipelines (Subsea or Submerged Pipelines) and Onshore Pipelines (Buried Pipelines).

The PPS Stationary Cutting Machine, shown in FIGS. 7 and 8, is specific for straight pipes that can rotate during the cutting of the external coating.

The Cutting Device shown in FIGS. 3 to 6 is called the PPS Cutting Device, which is a matter protected by document BR 10 2022 007711-8.

For the Drawing of the PPS System, after cutting, the PPS Automated Drawing Device is used, represented in FIGS. 9 and 10, or manually, through the Cover represented in FIG. 9 (9.5). For safety reasons, manual drawing is only allowed when the pipe is immobilized.

The range of Outer Diameters (OD) of externally coated carbon steel pipes, represented in FIG. 1 (1.13), applicable to this invention, is from 4½ to 32 inches (114.3 to 812.8 mm).

The range of Wall Thickness (eP) of externally coated carbon steel pipes, represented in FIG. 1 (1.11), applicable to this invention, is from ¼ to 2 inches (6.35 to 50.80 mm).

The standard PPS Stationary Cutting Machine is capable of cutting Collars (Cutbacks) in the range of 80 to 300 mm in Length (C), represented in FIG. 2 (2.6), with a tolerance of ±5 mm. For longer lengths, the Bar, represented in FIGS. 3 (3.1), 5 (5.8), 7 (7.5), 8 (8.9), and 10 (10.7) must be replaced by another one of greater length.

The execution of the chamfer of the Collar (Cutback) by cutting proposed in this invention ensures a uniform and stress-free surface in the coating system, favoring preservation and anti-corrosion protection. The Cut is done just before installation in the field or at sea, enough time for the layers to settle and for there to be no more residual stresses. The Bevel (FIG. 2 (2.1)) and the Collar (Cutback) (FIG. 2 (2.2)) will only be exposed for the time necessary for coupling, welding and inspection, ensuring their protection and integrity until the application of the definitive anti-corrosion protection system. The use of a sander, grinder, wire brush, or any other means of preparing the joint for welding is eliminated, as the Bevels and Collars (Cutbacks) will be made available, after cutting and removing the PPS System, within the specified standards, without need for any adjustments or additional preparation.

The Total Range of Thicknesses (eR) of the External Coating, represented in FIG. 1 (1.12), of Polyethylene in three layers (3-Layer PE) or Polypropylene in three layers (3-Layer PP), applicable to this invention, is from 1.6 to 10 mm.

The FBE Exposure Band (FBE Tail), represented in FIG. 2 (2.3), is performed simultaneously with the cut, which is done without generating non-recyclable waste, favoring the environmental issue.

The width (T) of the FBE Exposure Band (FBE Tail), represented in FIGS. 1 (1.10) and 2 (2.7), obtained by Cutting, is from 1 to 10 mm, depending on the Width, the Angle of the Sharpening of the Coating Cutting Edge, and the PPS Cutting Blade Lead Angle, represented in FIG. 3 (3.5). The tolerance is quite wide, with some specifications defining the range from 1 to 5 and others from 5 to 20 mm. The Width of the FBE Exposure Band (FBE Tail), (T), is inversely proportional to the Total Thickness of the Pipe External Coating. Therefore, for an external coating thicker than 5 mm, two or more turns may be necessary to make the FBE Exposure Band (FBE Tail).

The positioning of the PPS Cutting Blade (FIG. 3 (3.5)), with respect to depth, will be until it touches the layer of the Thermally Cured Epoxy (FBE), peeling off the second layer of Copolymer Adhesive. To prevent excessive pressure from the Blade on the FBE from peeling the same, the PPS Cutting Device has a mechanism with Springs for adjustment and impact absorption. A contributing factor is that the FBE Layer is smooth and cohesive, favoring the peeling process of the Copolymer Adhesive (Second Layer), which has a minimum thickness of 200 μm (0.2 mm), both for the three-layer coating of Polyethylene (3-Layer PE) and for the three-layer coating of Polypropylene (3-Layer PP). The FBE Layer (First Layer) is 250−100+100 μm (0.15 to 0.35 mm) thick.

The Thickness Range (e) of the PPS Cutting Blade applicable to this invention is from 3 to 12 mm.

The essential condition is that the Collar Chamfer (Cutback), (FIG. 2 (2.4)) after cutting is at the correct angle (β), <30°, with a tolerance of +0-2°, its surface is smooth and uniform, its Length (C) (FIG. 2 (2.6)) is in the specified measure, with a tolerance of ±5 mm, and that the range of FBE Exposure Band (FBE Tail) (FIG. 2 (2.3)), when specified by the Buyer, is performed by removing the entire layer of Copolymer Adhesive (second layer) without causing damage to the FBE, in the specified width (T).

The positioning of the Cut is a function of the length (A) (FIG. 1 (1.8)) and the thickness of the External Flap of the Cup represented in FIG. 3 (3.10) of the PPS System. The standard length (C) of the Collar (Cutback), represented in FIGS. 1 (1.9) and 2 (2.6), specified in ABNT NBR 15221-1, Polyethylene in three layers and ABNT NBR 15221-2, Polypropylene in three layers, is 120±10 mm. However, the buyer can specify shorter or longer lengths, maintaining a tolerance of ±10 mm.

The PPS Stationary Cutting Machine is capable of cutting Collars (Cutbacks), with a tolerance of ±5 mm in the specified length, contributing to greater dimensional accuracy, favoring the effectiveness of the field joint coating process.

The method described in this invention starts from the end of the External Flap of the component PPS System Cup, represented in FIG. 3 (3.10) and encompasses three activities: the first, cutting the external coating in order to obtain a Chamfer with an angle less than 30°, represented in FIG. 2 (2.4); the second, making the FBE Exposure Tail (FBE Tail), represented in FIG. 2 (2.3) simultaneously, quickly and accurately, and the third, performing the quick drawing of the PPS System, represented in FIGS. 1 (1.1), (1.2), (1.3) and (1.4), at the pipe site, on the vessel, or at the Onshore Base (Spoolbase). The currently available means do not fulfill these functions together and are not executed in the Field, in the Onshore Bases (Spoolbases), or in the Vessel.

The end of the External Flap of the Cup, represented in FIG. 3 (3.10), acts as a cutting facilitator, since it is not adhered to the surface of the Pipe, allowing the end of the PPS Cutting Blade to lift the coating on this region, propagating along the circumference of the Pipe.

The PPS Cutting Device, represented in FIGS. 3 to 6, is the element that will house the PPS Cutting Blade, represented in FIG. 3 (3.5), precisely and safely positioning the same, and consists of the following elements, represented in FIG. 3: the Adjustment Guide (3.2), the Body (3.3), the PPS Cutting Lever (3.4), and the PPS Cutting Blade Receptacle (3.6).

The PPS Cutting Device, represented in FIGS. 3 to 6, 7 (7.8), and 8 (8.7), is installed on the Bar, made of hollow extruded aluminum or laminated carbon steel, represented in FIGS. 3 (3.1), 5 (5.8), 7 (7.5), 8 (8.9), and 10 (10.7), and is the structural element to keep fixed the PPS Cutting Device and its parallelism in relation to the surface of the Pipe.

The PPS Cutting Blade Receptacle, in laminated carbon steel, is represented in FIGS. 3 (3.6), 4 (4.3) and 5 (5.5). This component can be articulated through the PPS Cutting Lever, represented in FIGS. 3 (3.4), 4 (4.2), 5 (5.11), 6 (6.1), and 8 (8.6), which goes from position 0°, fully retracted, represented in FIG. 5 (5.5), at 90°, fully lowered, at full depth of cut, represented in FIG. 6 (6.2). This Receptacle can house the PPS Cutting Blade both in the Left and Right positions, being, therefore, adaptable to both ends of the Pipe. It can be adjusted for Blades from 3 to 12 mm thick (e) and from 6 to 25 mm wide. It is already adjusted for the Chamfer angle (β)=29°, but it can be customized for other angles.

The Cutting Position Setting Screws, made of laminated carbon steel, represented in FIG. 4 (4.1), are installed on the front part of the Adjustment Guide, represented in FIG. 3 (3.2) and serve to secure the same to the Bar, represented in FIGS. 3 (3.1), 5 (5.8), 7 (7.5), 8 (8.9), and 10 (10.7).

The Adjustment Springs, represented in FIGS. 5 (5.6) and 6 (6.3), serve to keep the Blade pressed during cutting and absorb impacts caused by interferences that may be present on the surface of the Pipe. They are carbon steel spiral springs with dimensions and k coefficient designed not to damage the Epoxy Layer (FBE). The number of Springs can vary from 1 (one) to 6 (six). Optionally, the adjustment springs can be replaced by an air pocket connected to the central compressed air system. The air pressure in the pocket will be calibrated to keep the PPS Cutting Blade pressed, but without damaging the FBE layer (first layer).

The PPS Cutting Blade, represented in FIG. 3 (3.5), is made of laminated or forged carbon steel, with the faces to be sharpened (edges) hardened. The Width of the FBE Exposure Band (FBE Tail) (T), represented in FIG. 2 (2.7), is a function of the Blade Width, the Sharpening Angle, the Chamfer Angle (β) and the Lead Angle, being in the Range of 1 to 10 mm per Cut.

The sharpening angle of the PPS Cutting Blade makes it possible to cut without tearing, fraying, glazing, wrinkling the Pipe External Coating or making it becoming a paste, following a uniform line along its circumference; that is, the finish of the cut results in a uniform and clean surface, maintaining the original features of the applied coating, being superior to the finish generated in brushing.

The PPS Cutting Blade, (FIG. 3 (3.5)) may be heated by electrical resistance, electromagnetic induction, infrared, or another heat source, except by flame, in order to facilitate penetration and increase the speed of cut. The cutting speed is a function of material and coating thickness. The temperature range, minimum and maximum, is defined according to the material of the coating to be cut. The heated Blade can only touch the external coating during rotation; therefore, it must be retracted before the Pipe or the Machine stops turning, to prevent the generated heat from damaging the chamfer finish. The maximum temperature will always be 10% below the Softening Temperature (VICAT) of the third layer of the coating to be cut, which for Polyethylene (PE) is 115° C. and for Polypropylene (PP) is 145° C., according to Table A.3 of ABNT Standards NBR 15221-1 and 15221-2, respectively. Based on this premise, the temperature of the PPS Cutting Blade cannot be higher than 100° C. for Polyethylene (PE) and 130° C. for Polypropylene (PP).

The PPS Cutting Blade, represented in FIG. 3 (3.5), may be made using commercial materials, available in abundance on the market, such as blades for stilettos, chisels for wood, and cutting tools for lathes, once that the coatings are of polymeric material. In this specific case, High Density Polyethylene (HDPE) and Polypropylene (PP).

The Cut does not damage the PPS System Cup, represented in FIG. 1 (1.1), to allow its reuse and/or recycling, in order to respect the environment. All PPS System components will be reused and/or recycled.

The depth of the Cut is a function of the Outer Diameter and the Total Thickness of the Pipe External Coating; therefore, the machines will be calibrated based on these parameters. The PPS Cutting Device has Adjustment Springs and Support Wheels, as represented, respectively, in FIGS. 5 (5.6) and (5.12). The Support Wheels maintain the positioning of the PPS Cutting Device Bus, and the Adjustment Springs ensure that the PPS Cutting Blade is pressed onto the FBE Layer without pulling or damaging the same. The Adjustment Springs additionally have the purpose of allowing the PPS Cutting Blade to follow the surface imperfections and ovality eventually existing in the Pipe, cushioning the shocks.

The cut starts with the PPS Cutting Blade facing the Pipe External Coating (5.3 and 8.1) and, as the turn is developed, the depth is increased until the Blade touches the FBE Layer, as represented in FIG. 6 (6.2). Therefore, the Cut must overlap the initial area to ensure that the entire Adhesive Layer over the FBE Exposure Band (FBE Tail) is removed and that the full depth of cut is achieved around the entire circumference of the Pipe, allowing the drawing of the PPS system. For this reason, an inspection of the Bevel and Collar (Cutback) is foreseen, represented in FIGS. 9 (9.7) and 10 (10.3), exposed after cutting, based on defined Acceptance Criteria, before releasing the Pipe, in the area Inspection and Cutting represented in FIGS. 11 (11.2), 12 (12.2), 13 (13.2) and 14 (14.2). By adopting this procedure, if necessary, the cut can be rectified until it meets the acceptance criteria.

The length of the PPS Cutting Lever represented in FIG. 3 (3.4) allows the penetration of the PPS Cutting Blade manually, in an easy, firm and safe way.

The PPS Cutting Lever, represented in FIGS. 3 (3.4), 4 (4.2), 5 (5.11), and 6 (6.1) can be threaded both on the Front (Front) and the Back (Rear) parts of the PPS Cutting Blade Receptacle, represented in FIGS. 3 (3.6), 4 (4.3) and 5 (5.5), allowing the cut to be made at both ends of the pipe, Left and Right, using the same Receptacle.

The PPS Stationary Cutting Machine is mounted on a rigid structure of laminated carbon steel, as shown in FIG. 7 in Top View and FIG. 8 in Side View in section (SECTION A-A). The structure is designed to adjust the height of the PPS Cutting Device for each Pipe Outer Diameter. The Center line of the PPS Cutting Device is positioned at 3 o'clock (3 h), as shown in FIG. 8 (8.7). The Pipe rotates in a rotation compatible with the material and thickness of the external coating to be cut.

The PPS Stationary Cutting Machine, represented in FIGS. 7 and 8, is modular and dismountable to facilitate its transport. Its structure is designed in order to have the minimum weight sufficient for its use and function. For this reason, most of its structural components are made of hollow profiles of laminated carbon steel or extruded aluminum.

The PPS Stationary Cutting Machine, represented in FIGS. 7 and 8, is mounted on a modular structure that moves parallelly and perpendicularly to the Pipe Center Line, in order to position itself for cutting. However, this is performed with a static machine, justifying its denomination.

The Positioning Stop, represented in FIG. 7 (7.4) has a rotating cylinder, made of polymeric material, which leans against the end ("Nozzle") of the component PPS System Cup, represented in FIG. 1 (1.1), ensuring the correct positioning of the PPS Cutting Device, which is integral to the same, through the Bar.

The Bar represented in FIGS. 7 (7.5) and 8 (8.9) is made of hollow extruded aluminum or laminated carbon steel, with sufficient rigidity to withstand torsion and bending moments during the cutting process. It is installed flush and parallel to the Pipe Center line.

The cutting position is defined through the Stop represented in FIG. 7 (7.4). This stop is installed on the PPS Stationary Cutting Machine Bus, and is used to adjust the position of the PPS Cutting Device, so that the cut is made in the correct place. The Stop roller is made of polymeric material so as not to damage the end ("Nozzle") of the Cup (7.1) of the PPS System and rotates on a tapered roller bearing installed on a fixed shaft. It moves through a lever in the 0° position, leaning against the end ("Nozzle") of the Cup of the PPS Pipe System at 90°, retracted, as represented in FIGS. 7 (7.4) and 10 (10.6), respectively. A laser positioner can be used to replace the Stop represented in FIG. 7 (7.4).

On the Bar, represented in FIGS. 3 (3.1), 5 (5.8), 7 (7.5), and 8 (8.9) other accessories can be installed, such as a laser beam emitting device to adjust the positioning of the PPS Stationary Cutting Machine.

The Bar, represented in FIGS. 3 (3.1), 5 (5.8), 7 (7.5), 8 (8.9), and 10 (10.7), is integral to the PPS Stationary Cutting Machine Structure, being adjustable to up or down in order to align its Center Line at Position 3 o'clock (3 h) of the Pipe, as can be seen in the details of the invention.

The Bar, represented in FIGS. 3 (3.1), 5 (5.8), 7 (7.5), 8 (8.9) and 10 (10.7), can be replaced by one of greater length without the need for major changes in the Structure of the PPS Stationary Cutting Machine, since it is built in a modular way.

The Support Wheels, represented in FIGS. 7 (7.9) and 8 (8.5) are intended to ensure the correct distance between the surface of the Pipe External Coating (5.3 and 8.1) and the PPS Cutting Device, since the pipes present misalignment inherent to their manufacturing process. They have Springs or Pneumatic Devices to dampen vibrations and impacts during cutting.

Two identical structures of the PPS Stationary Cutting Machine will be assembled, one at each end of the Pipe, in order to make the cut simultaneously, gaining in productivity. In this case, the PPS Cutting Blade Receptacle is mounted upside down on the PPS Cutting Device on the Right Side. For this reason, the PPS Cutting Blade receptacle is designed so that it can be mounted in either the Left or Right position. The PPS Cutting Blade has the feature of being easily replaced by another sharpened or new one.

The PPS Stationary Cutting Machine Structure, represented in FIG. 8 (8.11), will have the ability to move forward and backward and sideways, in order to adapt to the Outer Diameter (OD) and the Pipe Length, respectively.

The PPS Cutting Lever, represented in FIGS. 3 (3.4), 4 (4.2), 5 (5.11), 6 (6.1), and 8 (8.6) is moved by an electric, hydraulic or pneumatic mechanism, represented in FIGS. 7 (7.7) and 8 (8.8), in an automated way, for simultaneous cuts at both ends of the Pipe using the PPS Stationary Cutting Machine.

The Rotating supports, represented in FIGS. 7 (7.3) and 8 (8.13) are designed to support the weight of the pipes without damaging its external coating.

The positioning of the cut can be done by laser beam, replacing the Stop represented in FIG. 7 (7.4).

The PPS Stationary Cutting Machine will optionally form an assembly with the PPS Automated Drawing Device, represented in FIGS. 9 and 10, one at each end of the pipe to be cut.

The PPS Automated Drawing Device, represented in FIGS. 9 and 10, is intended to draw and/or reposition the PPS System at the end of the Pipe, automatically or semi-automatically, after cutting. Its Structure (9.1), in laminated carbon steel, moves automatically, on rails, perpendicular to the Pipe Center Line, to 2 (two) positions: Position 1, Retracted, represented in FIG. 10 (10.4), so that the Pipe can move freely in the longitudinal direction, and Position 2, for Drawing and/or Repositioning of the PPS System, represented in FIG. 10 (10.1), with the Piston Center Line (9.2) coinciding with the Pipe Center Line, with the ends of the Coupling Jaws (9.4) at a distance from the end ("Nozzle") of the PPS System (9.6) that allows the drawing without any interference. The reference for positioning the ends of the Coupling Jaws (9.4) is the Positioning Stop of the PPS Stationary Cutting Machine, represented in FIGS. 7 (7.4) and 10 (10.6), since the Pipes have different lengths. The Piston (9.2) moves up or down to adjust to the Pipe Center Line. Coupling is done automatically, through the Coupling Jaws (9.4) on the Cover (9.5) of the PPS System (9.6). As soon as the cut is finished, the PPS Automated Drawing Device, represented in FIGS. 9 and 10, is driven and moves from Position 1 (10.4) to 2 (10.1). Next, the Piston (9.2) is driven and moves with its Disc (9.3) until the Coupling Jaws (9.4) connect to the Cover (9.5). Then, the Piston (9.2) is retracted, drawing the PPS System (9.6).

If the PPS System (9.6) has to be repositioned, after the inspection of the Collar (Cutback) and the Bevel, the PPS Automated Drawing Device will remain immobile, in Position 2, until the inspection ends. At the end of the inspection, the Piston (9.2) is driven and repositions the PPS System (9.6) in its original position, the Coupling Jaws (9.4) are uncoupled from the Cover (9.5), the Piston (9.2) is retracted, and the PPS Automated Drawing Device returns to Position 1 (10.4). If there is no need to reposition the PPS System (9.6), the PPS Automated Drawing Device is driven and returns to Position 1, and the Coupling Jaws (9.4) are driven, releasing the PPS System (9.6) for its destination final.

The Mechanism for driving the Coupling Jaws (9.4), for coupling and uncoupling the cover (9.5) and, if necessary, opening and closing the same automatically, can be purchased on the market, where there are several options already developed for these purposes. For this reason, it is not detailed in this invention.

The entire automation system, both for the PPS Stationary Cutting Machine, represented in FIGS. 7 and 8, and the PPS Automated Drawing Device, represented in FIGS. 9 and 10, is not part of the scope of this invention.

There are described below the Methods for Cutting and Drawing of the PPS System in the so-called PPS Cutting and Drawing Stations for Subsea or Submerged Pipelines and for Onshore Pipelines (Buried Pipelines).

For the installation of pipes with the ends preserved and protected by the PPS System in Subsea or Submerged Pipelines, the assembly, on the Onshore Base (Spoolbase), of a work station is adopted as the Cutting and Drawing Method, parallel to the Production Line, called the PPS Cutting and Drawing Station, represented in FIG. 11, installed in a sheltered and closed place. At this station, the PPS Stationary Cutting Machine, represented in FIGS. 7 and 8, and, optionally, the PPS Automated Drawing Device, represented in FIGS. 9 and 10, are installed at each end of the pipe, for cutting the coating, executing the FBE Exposure Band (FBE Tail), and drawing and/or repositioning of the PPS System.

The PPS Cutting and Drawing Station comprises the Inlet area (11.1), into which the pipes preserved and protected at both ends by the PPS System enter. Next, each pipe is transferred to the Cutting and Inspection Area (11.2). In this location, the Pipe rotates supported by the Rotating Supports shown in FIGS. 7 (7.3) and 8 (8.13), while the cut is performed by the PPS Stationary Cutting Machines, Left (11.6) and Right (11.7). As soon as the cut is finished, the PPS Automated Drawing Devices on the Left (11.5) and Right (11.8) sides are driven and draw the PPS System. At this step, the pipe is immobilized, and its exposed Collars (Cutbacks) and Bevels are inspected according to defined Acceptance Criteria and, if approved, the pipe goes to the Outlet Area (11.4); if it fails, it goes to the Adjustment and Repair Area (11.3). The use of the PPS Automated Drawing Device is optional, to increase productivity and decrease safety risks. If not used, the drawing or repositioning of the PPS System is done manually through the Cover (9.5), with the pipe immobilized.

For the Installation System of Subsea Pipelines (Subsea or Submerged Pipelines), called Type J (J Lay) Launch, using pipes with the ends preserved and protected by the PPS System, there is adopted as the Cutting and Drawing Method the assembly, on the vessel, of a Work Station, parallel to the Production Line, called the PPS-J Cutting and Drawing Station, represented in FIG. 12. This launching system produces columns of 4 (four) welded pipes, called quadri joints (12.12), which will be produced, stored, and then each one is lifted and placed in a vertical position to be welded to the other and launched to the sea, and so on. The pipes that make up the column will be numbered from 1 (one) to 4 (four), to illustrate the method, in pipes that use the PPS System as protection of the ends. In this method, the pipes enter the PPS-J Cutting and Drawing Station through the Inlet Area (12.1). Next, each pipe has its external coating cut simultaneously by the Left (12.6) and Right (12.7) Stationary Cutting Machines. Next, the Left (12.5) and Right (16.8) PPS Automated Drawing Devices are driven and draw the PPS System from both ends of the Pipe, which are inspected according to defined Acceptance Criteria. If the result is approved, the Pipe goes to the Outlet area (12.4); if it fails, it goes to the Adjustment and Repair area (12.3).

For Method J (J Lay), the Pipe 1, after approval, has the PPS System repositioned at its Right end (12.11), and the Pipe 4, after approval, has the PPS System repositioned at its Left End (12.9), still in the Cutting and Inspection area. The Pipes 2 and 3 (12.10) follow without the PPS System at both ends; then, the 4 (four) pipes go to the assembly line of the column (12.12). Just before lifting the column, the PPS System (9.6) is manually removed from both ends by the Cover (9.5). The use of the PPS Automated Drawing Device is optional, to increase productivity and reduce safety risks. If not used, the drawing or repositioning of the PPS System is done manually through the Cover (9.5), with the pipe immobilized.

For the Installation System of Subsea Pipelines (Subsea or Submerged Pipelines), called Type S (S Lay) Launch, using pipes with the ends preserved and protected by the PPS System, there is adopted as the Cutting and Drawing Method the assembly, on the vessel, of a Work Station, parallel to the Production Line, called the PPS-S Cutting and Drawing Station, represented in FIG. 13. This launching system produces columns of 2 (two) welded pipes, called double joints (13.11), which will be produced, stored, and then each one is introduced into the assembly and installation line to be welded to another and launched to the sea, and so on. The pipes that make up the column will be numbered from 1 (one) to 2 (two), to illustrate the method, in pipes that use the PPS System as end protection. In this method, the pipes enter the PPS-S Cutting and Drawing Station through the Inlet Area (13.1). Next, each pipe has its external coating cut simultaneously by the Left (13.6) and Right (13.7) Stationary Cutting Machines. Next, the Left (13.5) and Right (13.8) PPS Automated Drawing Devices are driven and draw the PPS System from both ends of the Pipe, which are inspected according to defined Acceptance Criteria. If approved, the Pipe goes to the Outlet area (13.4); if it fails, it goes to the Adjustment and Repair area (13.3). For Method S (S Lay), the Pipe 1, after approval, has the PPS System repositioned at its Right End (13.10), and the Pipe 2, after approval, has the PPS System repositioned at its Left End (13.9), still in the Cutting and Inspection area. Then, the 2 (two) pipes go to the assembly line of the Column (13.11).

Just before introducing the Column into the Production Line, the PPS System is manually removed from both ends by using the Cover (9.5). The use of the PPS Automated Drawing Device is optional, to increase productivity and reduce safety risks. If not used, the drawing or repositioning of the PPS System (9.6) is done manually through the Cover (9.5), with the pipe immobilized.

The Installer of Subsea or Submerged Pipelines using the J or S (J or S Lay) Cutting and Drawing Methods may choose to have the Pipes transferred to the Vessel without the PPS System Cover, represented in FIG. 1 (1.3). In this case, there must be spare covers on the Vessel, in sufficient quantity, for the manual drawing of the PPS System.

The PPS Automated Drawing Device, represented in FIGS. 9 and 10, shall have a Cover, represented in FIG. 9 (9.5) connected to its Fitting Disc, represented in FIGS. 9 (9.3) and 10 (10.5), a Cover, represented in FIG. 9 (9.5), to draw and/or reposition the PPS System. In this condition, there shall be a mechanism to rotate the PPS Cover both clockwise and counterclockwise, to allow its coupling to and uncoupling from the PPS System, represented in FIG. 9 (9.6).

For the construction and assembly of Onshore Pipelines (Buried Pipelines), using pipes with the ends preserved and protected by the PPS System, the assembly, at the Pipe Site, of a Work Station is adopted as the Cutting and Drawing Method, parallel to the Production Line, installed in a sheltered and closed place, called the PPS Cutting and Drawing Station, represented in FIG. 14. In this method, the pipes enter the PPS Cutting Station through the Inlet Area (14.1). Next, each pipe has its external coating cut simultaneously by the Left (14.6) and Right (14.7) Stationary Cutting Machines. Next, the Left (14.5) and Right (14.8) PPS Automated Drawing Devices are driven and draw the PPS System from both ends of the Pipe, which are inspected according to defined Acceptance Criteria. If approved, the PPS System is repositioned at both ends and Qualified Anti-Corrosion Adhesive Tapes (14.9) are applied over the cuts, for this purpose. The exposure time of the Collar (Cutback) and the Bevel, between the removal of the PPS System and its repositioning, cannot exceed the time specified in the Inspection Criterium. This time depends on the Relative Humidity of the air and the Ambient Temperature at the time of cutting. The approved Pipes with Qualified AntiCorrosive Adhesive Tape over the cuts (14.10) are transferred to the Outlet Area (14.4) and then are released for passing on the Band (14.11). The application of the Qualified Anticorrosive Adhesive Tape aims at protecting the area exposed by the cut from the weather, since the pipes can be passed on or stored along the Band, in open-air, for periods that can last days or even months. In this condition, the drawing of the PPS System will be done manually through the Cover represented in FIGS. 1 (1.3), 8 (8.3), and 9 (9.5), after removing the protective tape, at the time of alignment for welding in the field. The use of the PPS Automated Drawing Device is optional, to increase productivity and reduce safety risks. If not used, the drawing or repositioning of the PPS System is done manually through the Cover (1.3, 8.3, and 9.5), with the pipe immobilized through an automatic safety device. This method depends on the contractor's prior approval and is only feasible in Onshore Pipelines (Buried Pipelines), with a quantity of pipes to be installed that justifies the investment in this infrastructure, depending on productivity requirements and cost reduction.

The invention claimed is:

1. A system for cutting a pipe, the system comprising:
- a cup positioned between a pipe wall of the pipe and an external coating of the pipe, wherein the cup comprises a nozzle, which extends from an end of the pipe;
- a cover coupled to the cup and positioned inside the pipe;
- a seal disposed between the cup and the pipe wall;
- a pipe rotating support comprising two or more wheels which contact the external coating of the pipe;
- a bar support column connected to a structural frame;
- a bar positioned adjacent the pipe and oriented parallel to a centerline of the pipe;
- a positioning stop slidably disposed on the bar and positioned to contact the nozzle;
- two or more support wheels slidably disposed on the bar and positioned to contact the pipe;
- a cutting device slidably disposed on the bar and positioned adjacent the cup, the cutting device comprising:
  - a cutting blade receptacle mounted in an inverted position;
  - a cutting blade;
  - a cutting lever; and
  - a cutting lever drive piston; and
- an automated drawing device positioned adjacent the nozzle and comprising jaws to grip the cover and move relative to the pipe.

2. The system of claim 1, wherein an outer diameter of the pipe ranges from 4½ to 32 inches.

3. The system of claim 1, wherein the structural frame is slidably disposed on a base and is configured to move in a direction parallel to the centerline of the pipe and in a direction orthogonal to the centerline of the pipe.

4. The system of claim 3, wherein the structural frame, the base, the bar support column, and the bar are each independently removable and replaceable.

5. The system of claim 1, wherein the bar is hollow and comprises extruded aluminum or laminated carbon steel.

6. The system of claim 5, wherein the bar is replaceable with a second bar.

7. The system of claim 1, wherein each of the two or more support wheels are coupled to the cutting device via one or more dampeners.

8. The system of claim 1, wherein the positioning stop comprises a rotating cylinder disposed on a shaft, the positioning stop configured to hold the cutting device in position relative to the pipe.

9. The system of claim 8, wherein the rotating cylinder is coupled to the shaft, wherein the shaft is coupled to the bar.

10. The system of claim 8, wherein the positioning stop further comprises a lever configured to adjust the position of the rotating cylinder.

11. The system of claim 1, wherein the cutting lever is operated manually.

* * * * *